United States Patent
Takeda

(10) Patent No.: US 6,491,593 B2
(45) Date of Patent: Dec. 10, 2002

(54) GOLF CLUB

(75) Inventor: Hitoshi Takeda, Tsubame (JP)

(73) Assignee: K.K. Endo Seisakusho (JP)

( * ) Notice: Subject to any disclaimer, the term of this patent is extended or adjusted under 35 U.S.C. 154(b) by 0 days.

(21) Appl. No.: 09/921,724

(22) Filed: Aug. 3, 2001

(65) Prior Publication Data

US 2002/0082116 A1 Jun. 27, 2002

(30) Foreign Application Priority Data

Dec. 25, 2000 (JP) .................................. 2000-393516

(51) Int. Cl.$^7$ .............................................. A63B 53/04
(52) U.S. Cl. ..................... 473/342; 473/349; 473/350
(58) Field of Search ............................... 473/342, 324, 473/329, 332, 345, 346, 347, 348, 349, 350

(56) References Cited

U.S. PATENT DOCUMENTS

| | | | | |
|---|---|---|---|---|
| 5,290,036 A | * | 3/1994 | Fenton | |
| 5,431,396 A | * | 7/1995 | Shieh | |
| 5,536,006 A | * | 7/1996 | Shieh | |
| 5,669,825 A | * | 9/1997 | Shira | |
| 5,967,903 A | * | 10/1999 | Cheng | |
| 5,993,329 A | * | 11/1999 | Shieh | |
| 6,001,032 A | * | 12/1999 | Onuki | |
| 6,042,486 A | * | 3/2000 | Gallagher | |
| 6,319,149 B1 | * | 11/2001 | Lee | |

FOREIGN PATENT DOCUMENTS

JP          2560272         12/1993

* cited by examiner

Primary Examiner—Sebastiano Passaniti
(74) Attorney, Agent, or Firm—Akerman Senterfitt

(57) ABSTRACT

A higher performance golf club with a high degree of freedom for the choice of materials used for the head is provided. A shaft 3 is connected to a head made by combining a head body 7, a face member 8 and a weight 10. Then with regards to the head 2, a step 11 is formed in a face corresponding portion 1A of the head body 7, and the face member 8 of a different type to the head body 7 is arranged in the step 11. A ring member 9 is provided so as to span between the head body 7 and the face member 8. The head body 7 and the ring member 9 are secured together to thereby stoppingly engage the front face edge 8A side of the face member 8 by means of the steps 11 and 12, and on the other hand, the rear face 8B is stoppingly engaged by means of the ring member 9. Hence the face member 8 itself can be secured without welding.

4 Claims, 12 Drawing Sheets

GOLF CLUB

BACKGROUND OF THE INVENTION

1. Field of the Invention

The present invention relates to a golf club with a shaft attached to one side of the head.

2. Description of the Related Art

Heretofore, it is well known that a golf club is given high performance by combining different metals to form the head. For example, in Japanese Patent No. 2560272 there is an example where a recessed part is formed in a face corresponding portion of a head body, and a face member is press fitted into the recessed part. By using ajoining method that utilizes this kind of plastic deformation to form the head body from a metal of a high specific gravity such as iron or copper or an alloy of these metals, and arrange a lighter metal such as pure titanium on the face, a head where the moment of inertia is large taking advantage of the difference in specific gravity, that is a head that does not deflect easily, can be provided.

However, in the case of providing an even more high performance golf club, it is necessary to make the metal that is used itself high performance. However, amongst these kind of high performance metals, there are metals that are not suitable for or are difficult to effect plastic deformation. For example, metals such as titanium alloy and amorphous alloy have the advantage that they enable the thickness of the face to be thin because of their high strength and hardness, enabling redistribution of the weight of that part, or the advantage of high resilience. However, with these materials plastic deformation is difficult. In addition, in the case where they are forcefully deformed, there is the likelihood of the occurrence for example of gaps between the members, a reduction in connection strength and warping. As a means for solving these problems, it is also possible to form for example one of the connecting members from a soft metal. However in this case there is the disadvantage of susceptibility to marking. Moreover, the degree of freedom for the material combinations is lowered.

SUMMARY OF THE INVENTION

Accordingly, it is an object of the present invention to provide a higher performance golf club with a high degree of freedom for the choice of materials used for the head.

A first aspect of the present invention is a golf club with a shaft connected to one side of a head made by combining a plurality of members, wherein the head has a step formed in a head body, and a member of a different type to the head body is arranged on this step, a ring member is provided so as to span between the head body and the member of a different type, and the member of a different type is secured by securing the ring member to the head body.

According to the construction of the first aspect, when the member of a different type is secured, it is secured via the ring member.

A second aspect of the present invention is a golf club with a shaft connected to one side of a head, wherein the head is formed by forming a step in a face corresponding portion of a head body, arranging a face member in the step, arranging a ring member so as to span between the head body and the face member, and securing the ring member to the head body to thereby secure the face member to the head body.

According to the construction of the second aspect, when the face member is secured to the head body, it is secured via the ring member.

A third aspect of the present invention is a golf club with a shaft connected to one side of a head, wherein the head is formed by forming a through hole in a head body, forming a step in a face corresponding portion of the head body, arranging a face member in the step, arranging a ring member behind the face member and securing the ring member to the head body to thereby secure the face member to the head body.

According to the construction of the third aspect, the face member can be secured via the ring member arranged behind the face member.

A fourth aspect of the present invention is a golf club according to the third aspect, wherein a member with a lighter specific gravity than the head body is secured to a recess portion in a rear face of the head body.

According to the construction of the fourth aspect, the weight distribution of the head can be adjusted by securing the member with a lighter specific gravity than the head body to the recess portion in the rear face of the head body.

A fifth aspect of the present invention is a golf club with a shaft connected to one side of a head, wherein the head is formed by forming a recess portion in a face corresponding portion of a head body, forming a step in a front face of a face member, combining a ring member with the step to form a face and securing the ring member to the head body.

According to the construction of the fifth aspect, the face member can be secured via the ring member provided on the front face of the face member.

A sixth aspect of the present invention is a golf club according to any one of the first through fifth aspects, wherein the securing is performed by laser welding.

According to the construction of the sixth aspect, a weld portion can be accurately formed.

BRIEF DESCRIPTION OF THE DRAWINGS

FIG. 13 is a cross-section view illustrating a fourth embodiment of the present invention, while FIG. 13(a) is a partly enlarged section thereof.

DESCRIPTION OF THE PREFERRED EMBODIMENTS

Figure 1:
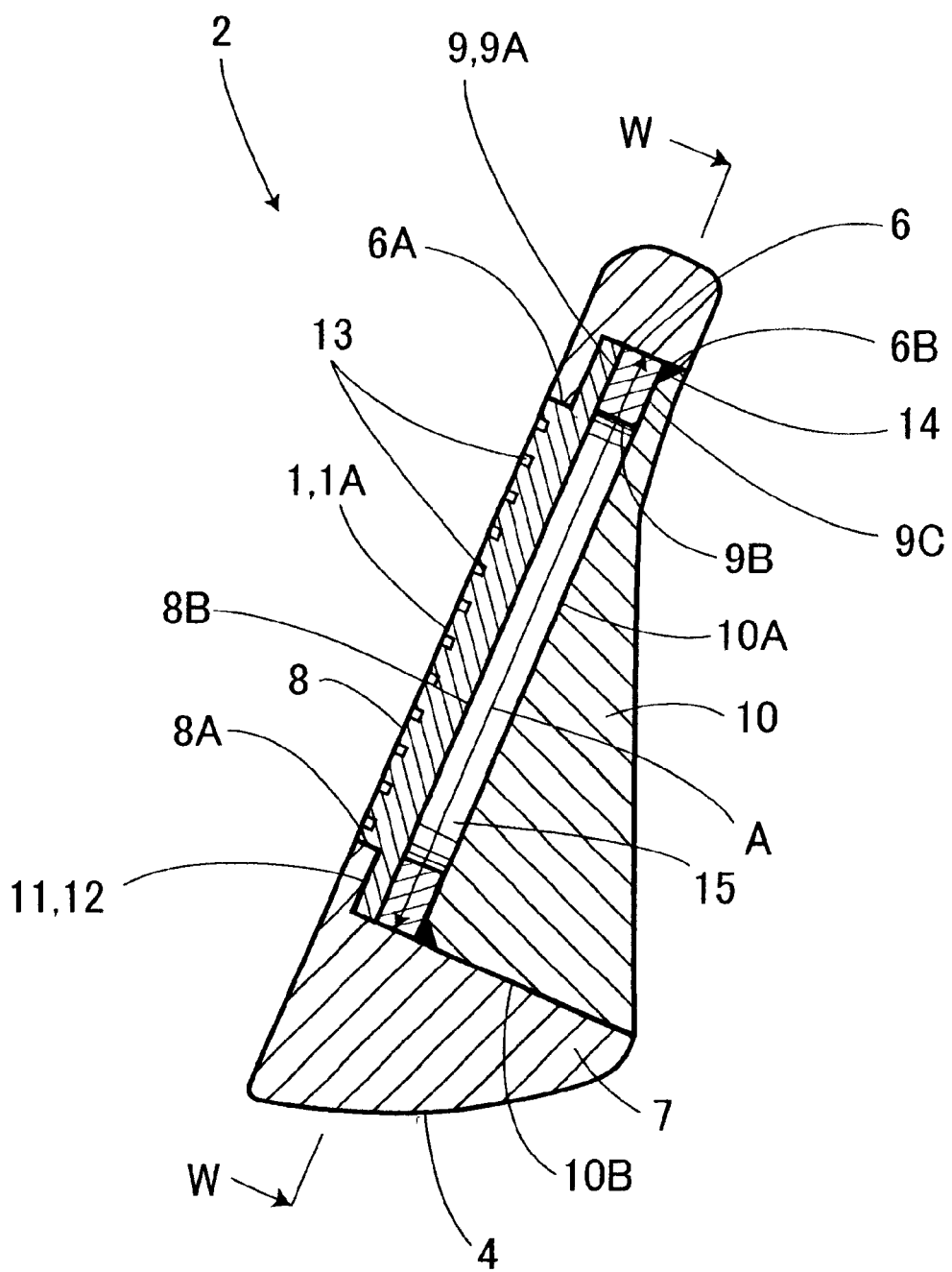
FIG. 1 is a cross-section view illustrating a first embodiment of the present invention.
Figure 2:
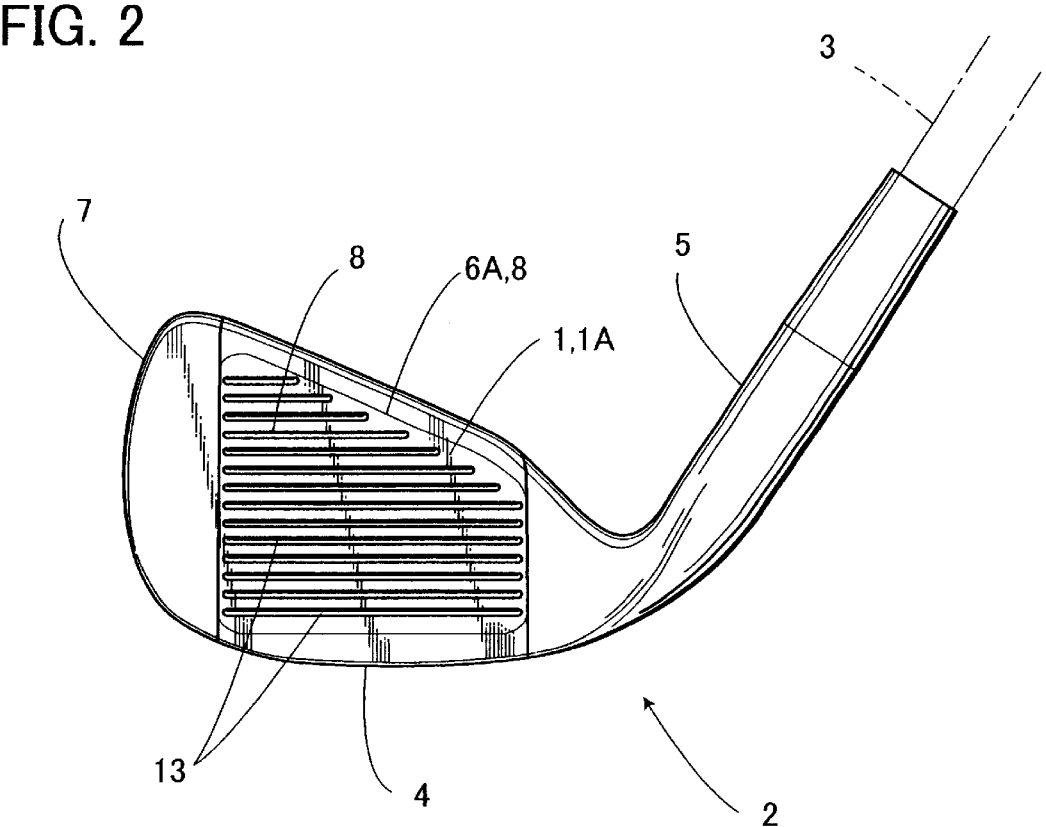
FIG. 2 is a front view illustrating the first embodiment of the present invention.
Figure 3:
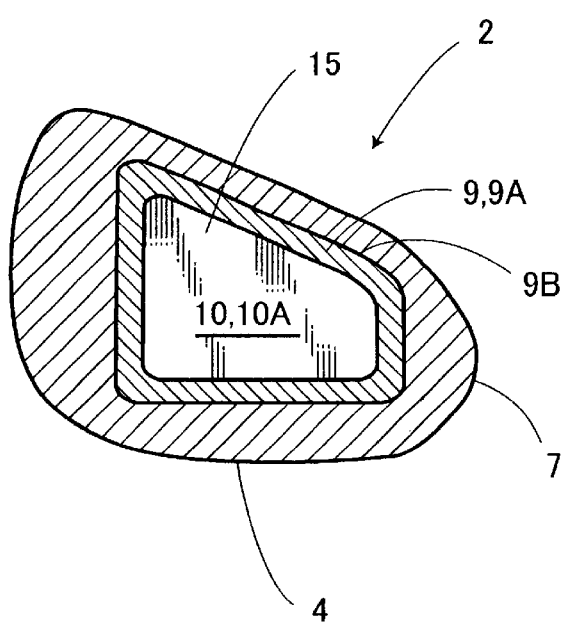
FIG. 3 is a cross-section on line W—W of FIG. 1 which illustrates the first embodiment of the present invention.
Figure 4:
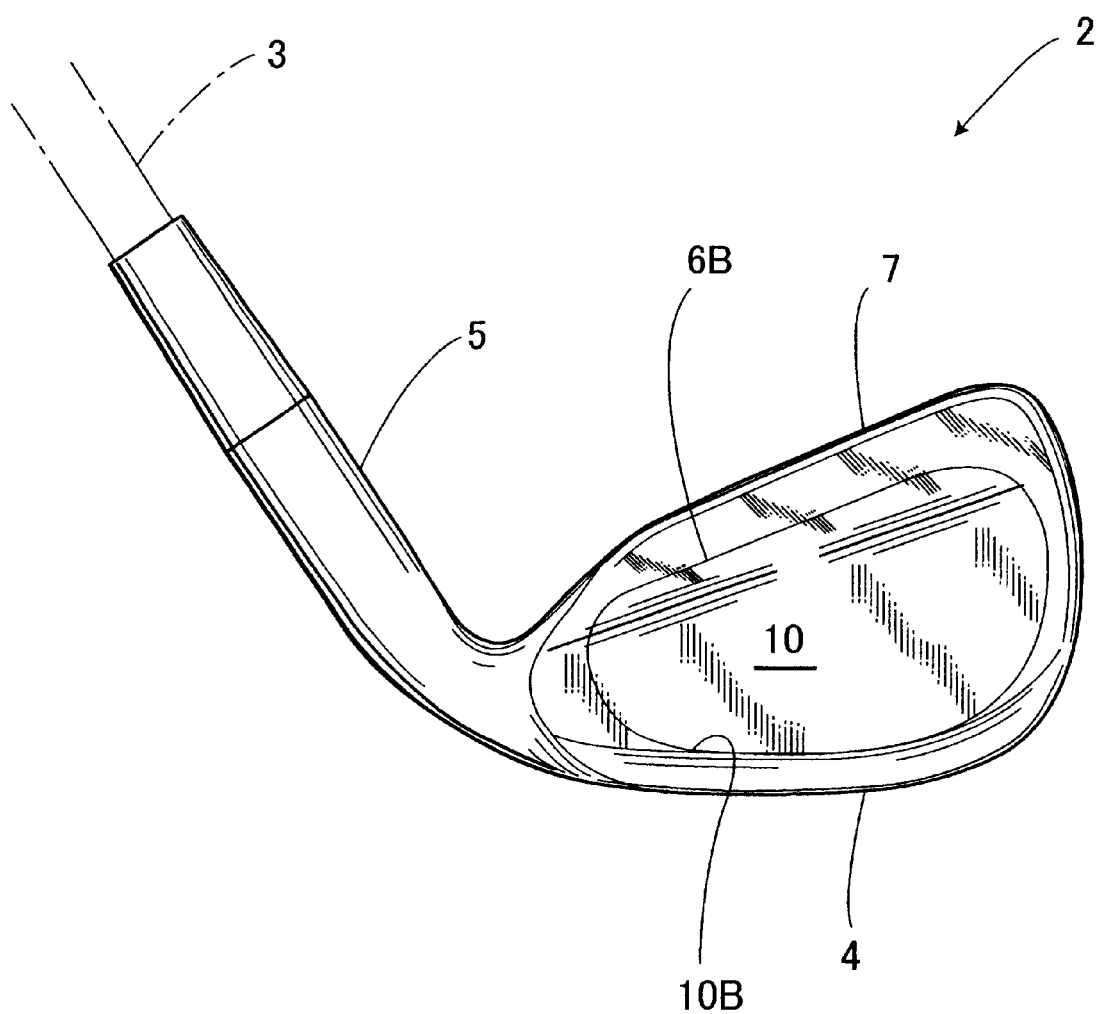
FIG. 4 is a rear view illustrating the first embodiment of the present invention.
Figure 5:
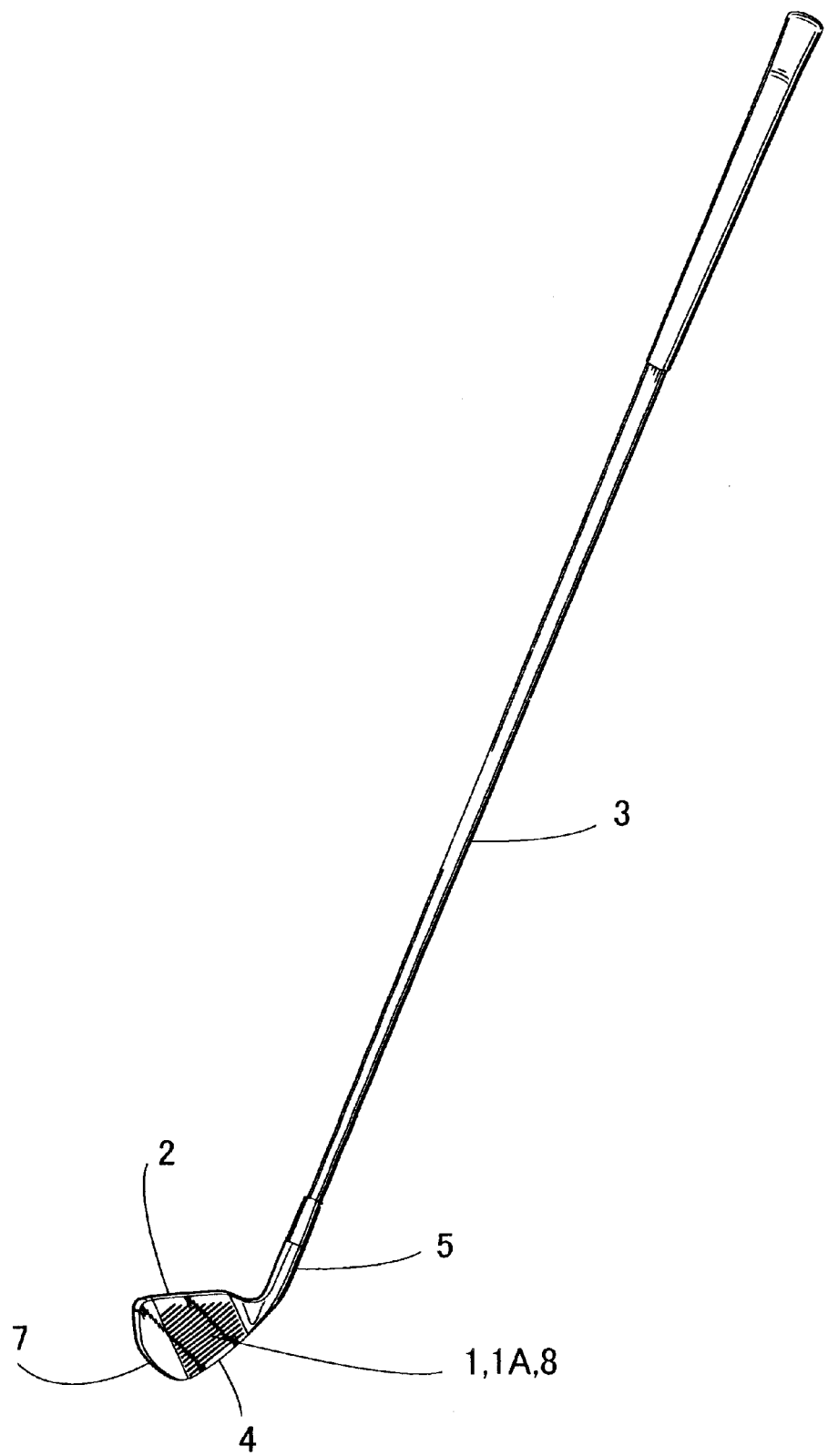
FIG. 5 is an overall perspective view illustrating the first embodiment of the present invention.

Hereunder is a description of embodiments of the present invention with reference to the appended drawings. As shown in a first embodiment of FIG. 1 to FIG. 5, an iron type golf club is one where a shaft 3 is connected to one side of a head 2 provided with a face 1 being a ball hitting portion, on the front. The head 2 is formed from: a stainless steel head body 7 with a sole 4 formed on a lower part, a shaft connecting portion 5 called a hosel provided sloping upward on one side, and a through hole 6 formed facing rearward in a face corresponding portion 1A; a titanium alloy face member 8 arranged in a front portion of the through hole 6; and a ring member 9 and a pure titanium weight 10 for adjusting the weight balance arranged in turn behind the face member 8.

The through hole 6 of the head body 7 is formed with a slightly widened opening width A on a rear side via a step 11 on a front opening edge 6A, and penetrates rearward with approximately the same size as the opening of this step 11 (opening width A). The face member 8 is a thin plate with a rear side formed wider than a front face edge 8A via a step 12. The front of the face member 8 is fitted into the front face opening edge 6A, the step 12 into the step 11, and the rear edge face of the face member 8 into the through hole 6. Moreover, the ring member 9 is provided on a rear face 8B of the face member 8. The ring member 9 is one where at least a front face 9A, an outer peripheral face 9B and a rear face 9C are formed flat, and is formed in an annular shape in plan. The ring member 9 is made from a material such as stainless steel that can be laser welded to the material forming the through hole 6. The front face 9A is abutted against the rear face of the face member 8 so that the steps 11 and 12 are tightly fitted to each other, and the outer peripheral face 9B is fitted into the through hole 6. That is, the ring member 9 is arranged so as to span across the head body 7 and the face member 8, and the rear face 9C side and the through hole 6 are welded by laser welding. Moreover, reference symbol 13 denotes transverse grooves called score lines, formed in the front face of the face member 8, and reference symbol 14 denotes a weld portion formed between the rear face 9C and the through hole 6. As a result, the face member 8 is secured to the head body 7. Furthermore, by securing the face member 8 to the head body 7, a rear face recess portion 6B is formed in the rear side in the through hole 6. The abovementioned weight 10 of pure titanium with a lighter specific gravity than that of the material of the head body 7 is press fitted into this recess portion 6B so that a peripheral face 10B thereof is secured to the through hole 6. The weight 10 is one where a front face 10A is formed in a plane, so that a cavity 15 is formed between the front face 10A and the rear face 8B of the face member 8 via the ring member 9.

Consequently, in this embodiment, when the head 2 is formed from the head body 7, the face member 8 and the weight 10 made from different materials, by stoppingly engaging the front face edge 8A of the face member 8 with the front face opening edge 6A of the through hole 6, and stoppingly engaging the rear face 8B with the ring member 9 which is secured by the weld portion 14 to the head body 7, the impact force at the time of hitting a golf ball can be transmitted to the head body 7 via the face 1, the face member 8 and the ring member 9. In particular, since the ring member 9 is annular and continuous, the occurrence of localized stress can be prevented.

In this manner, in this embodiment, in the golf club with the shaft 3 connected to one side of the head 2 made by combining the head body 7, the face member 8 and the weight 10, then with regards to the head 2, the step 11 is formed in the face corresponding portion 1A of the head body 7, the face member 8 of a different type to the head body 7 is arranged in the step 11, and the ring member 9 is provided so as to span between the head body 7 and the face member 8. By securing the head body 7 and the ring member 9 together to thereby stoppingly engage the front face edge 8A side of the face member 8 by means of the steps 11 and 12, and on the other hand, by stoppingly engaging the rear face 8B by means of the ring member 9, the face member 8 itself can be secured without welding.

Moreover, in this embodiment, as a means for securing the face member 8 for directly hitting a golf ball, provided on the face corresponding portion 1A, by stoppingly engaging the front face edge 8A side of the face member 8 by means of the steps 11 and 12, and stoppingly engaging the rear face 8B by means of the ring member 9, the face 1 can be a high performance material without utilizing welding. Hence a high performance head 2 and consequently golf club can be provided.

In addition, the through hole 6 is formed rearwardly from the face corresponding portion 1A in the head body 7. The face member 8 is arranged on the face corresponding portion 1A with the front side thereof stoppingly engaged by means of the steps 11 and 12 and the back portion arranged rearwards and stoppingly engaged by the ring member 9 welded to the head body 7. Therefore, the face member 8 can be reliably secured.

Furthermore, because the weight 10 arranged at the back portion of the head 2 is made from pure titanium with a lighter specific gravity than the stainless steel head body 7, the weight distribution of the head 2 can be set freely.

Moreover, in this embodiment, because a cavity 15 is provided between the face member 8 and the weight 10, the degree of freedom for shape change of the face member 8 can be increased.

Figure 6:
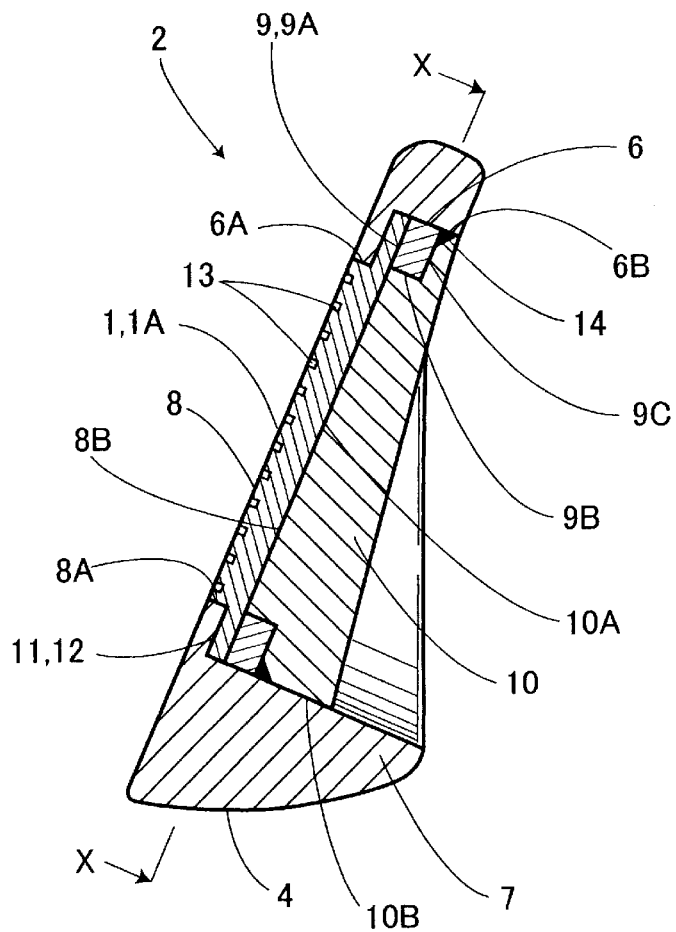
FIG. 6 is a cross-section view illustrating a second embodiment of the present invention.
Figure 7:
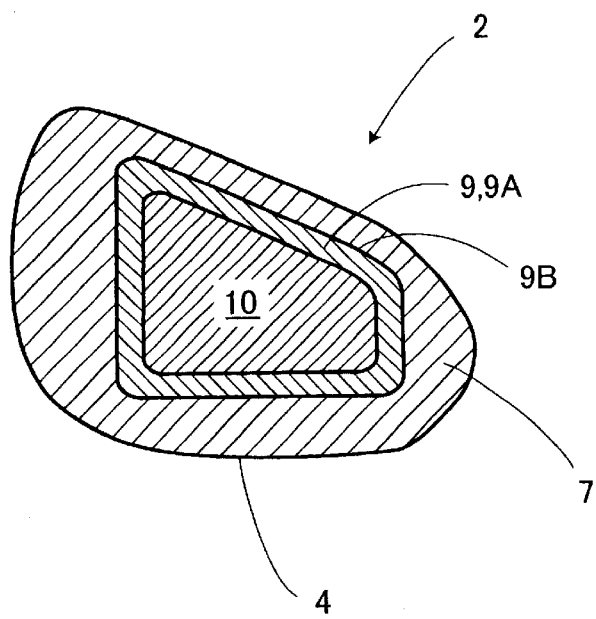
FIG. 7 is a cross-section on line X—X of FIG. 6 which illustrates the second embodiment of the present invention.
Figure 8:
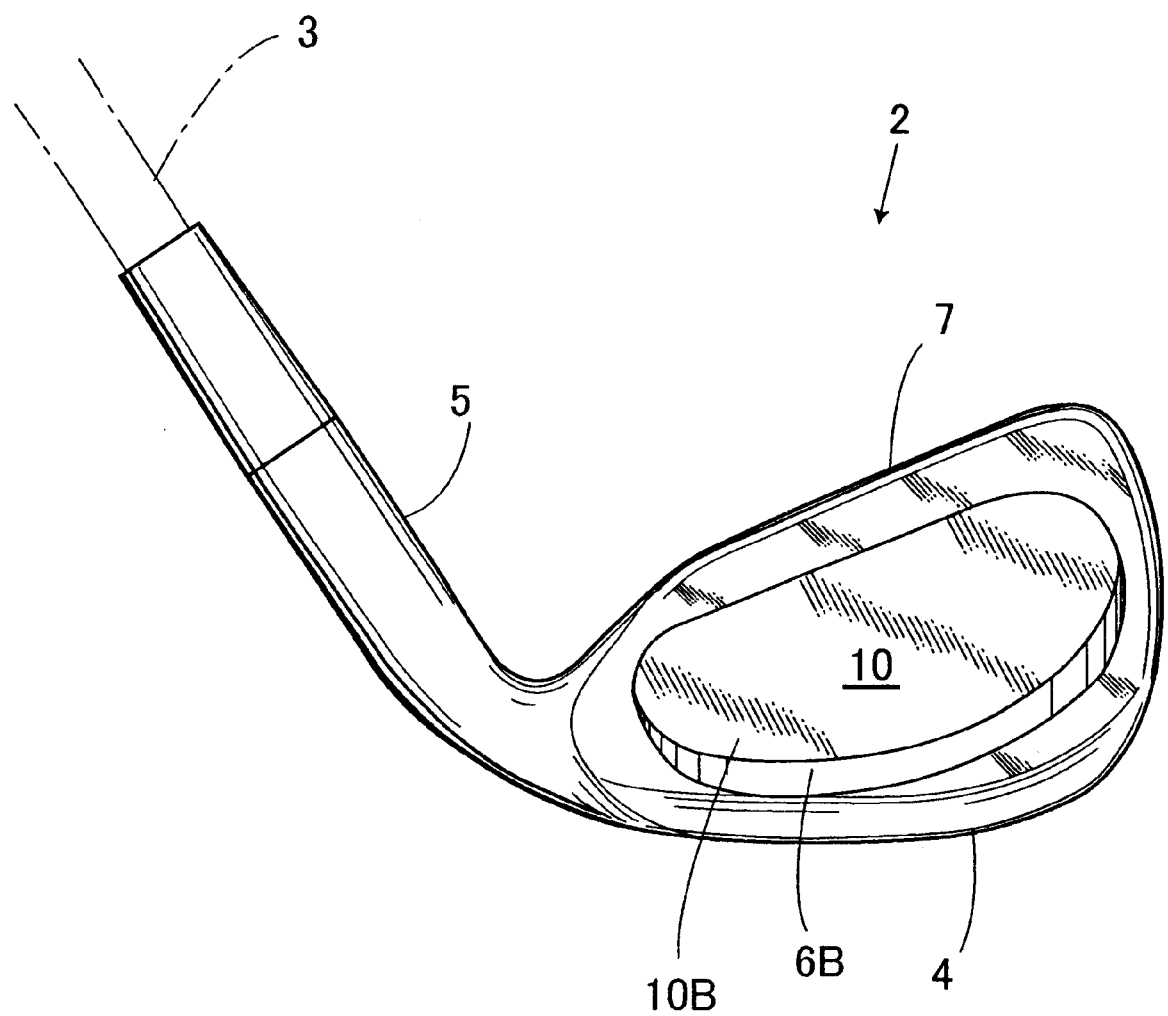
FIG. 8 is a rear view illustrating the second embodiment of the present invention.
Figure 9:
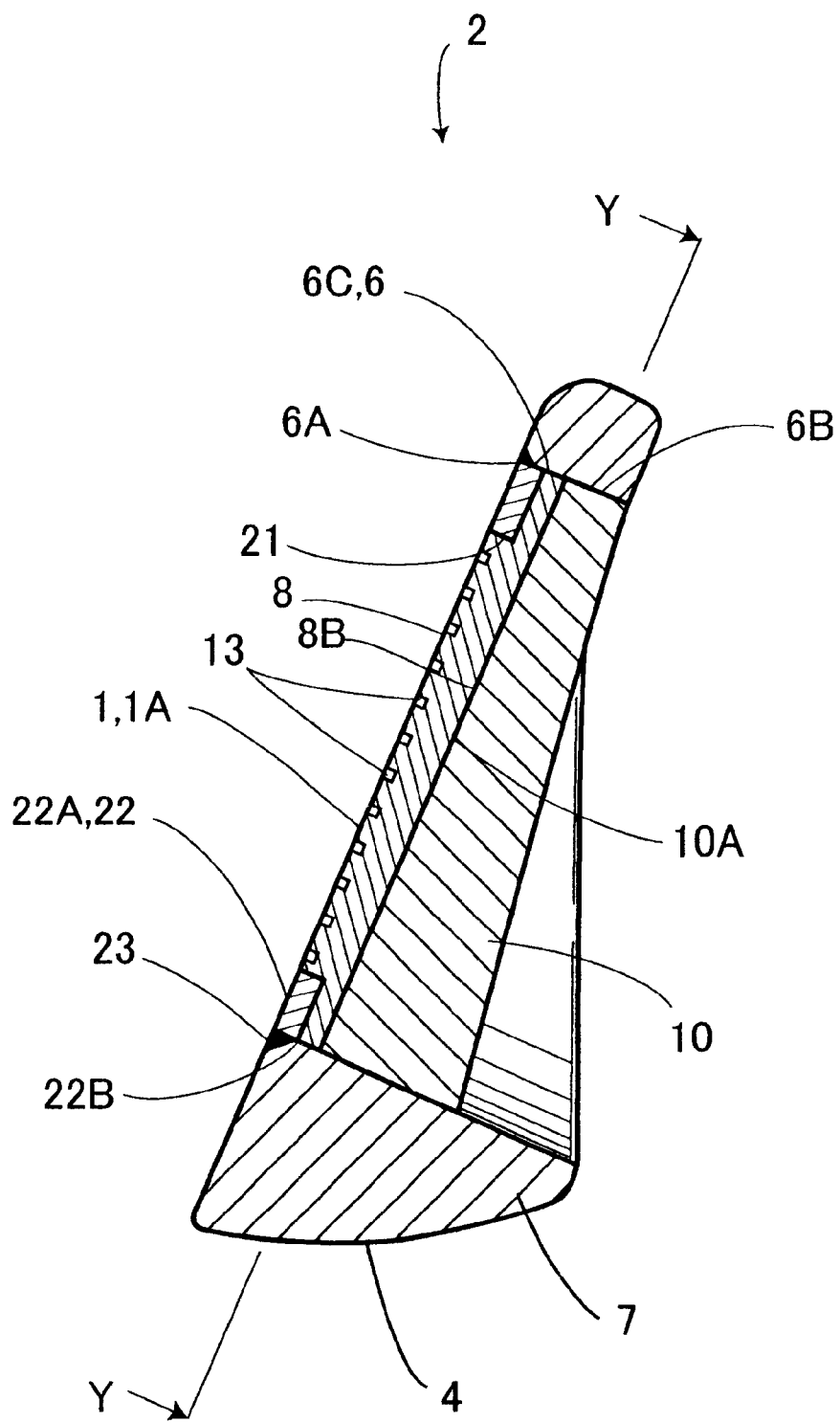
FIG. 9 is a cross-section view illustrating a third embodiment of the present invention.
Figure 10:
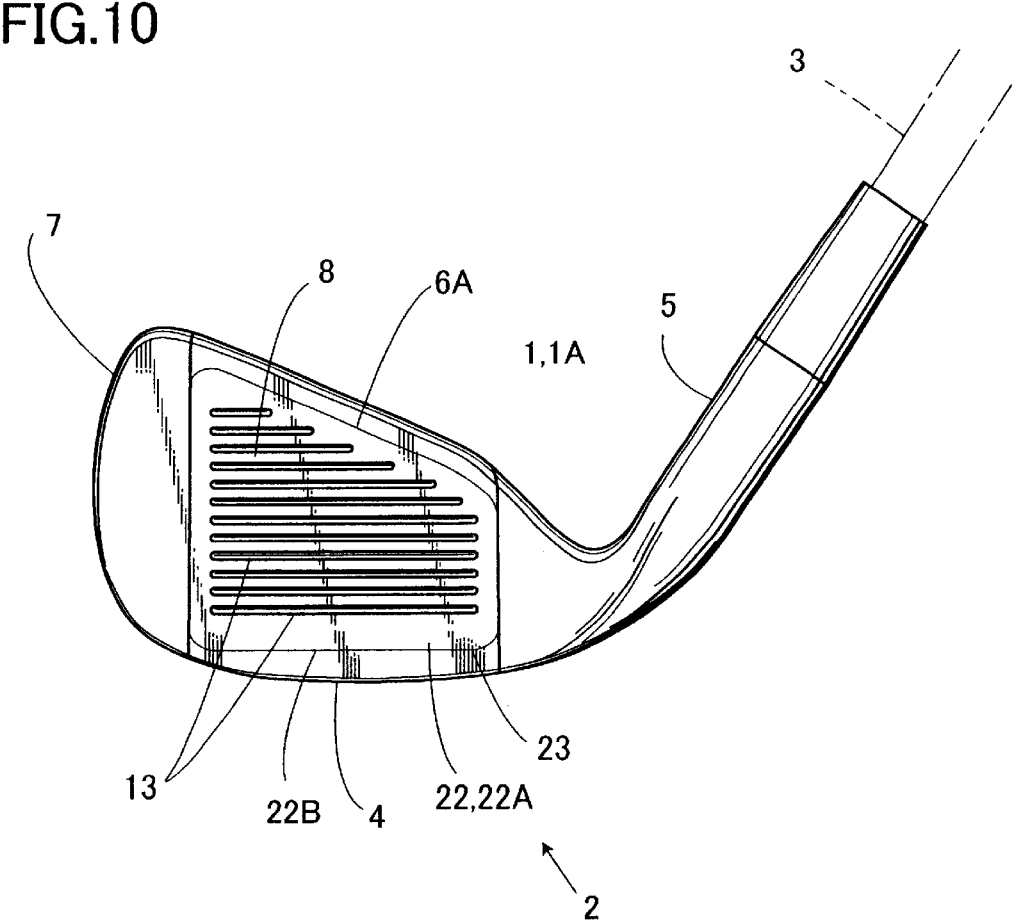
FIG. 10 is a front view illustrating the third embodiment of the present invention.
Figure 11:
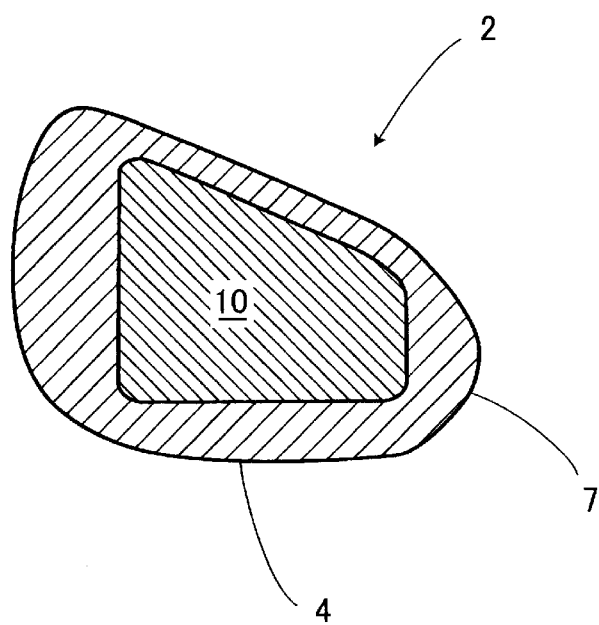
FIG. 11 is a cross-section on line Y—Y of FIG. 9 which illustrates the third embodiment of the present invention.
Figure 12:
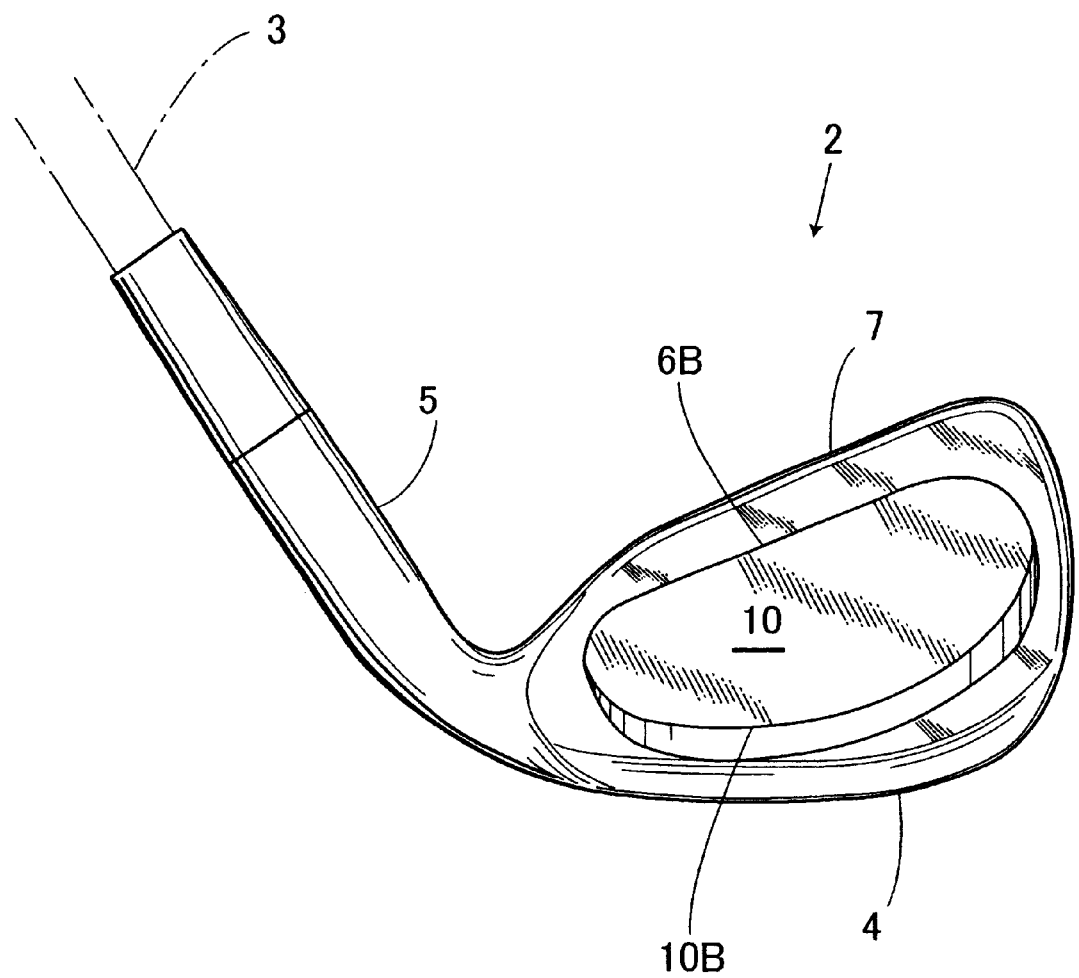
FIG. 12 is a rear view illustrating the third embodiment of the present invention.
Figure 13:
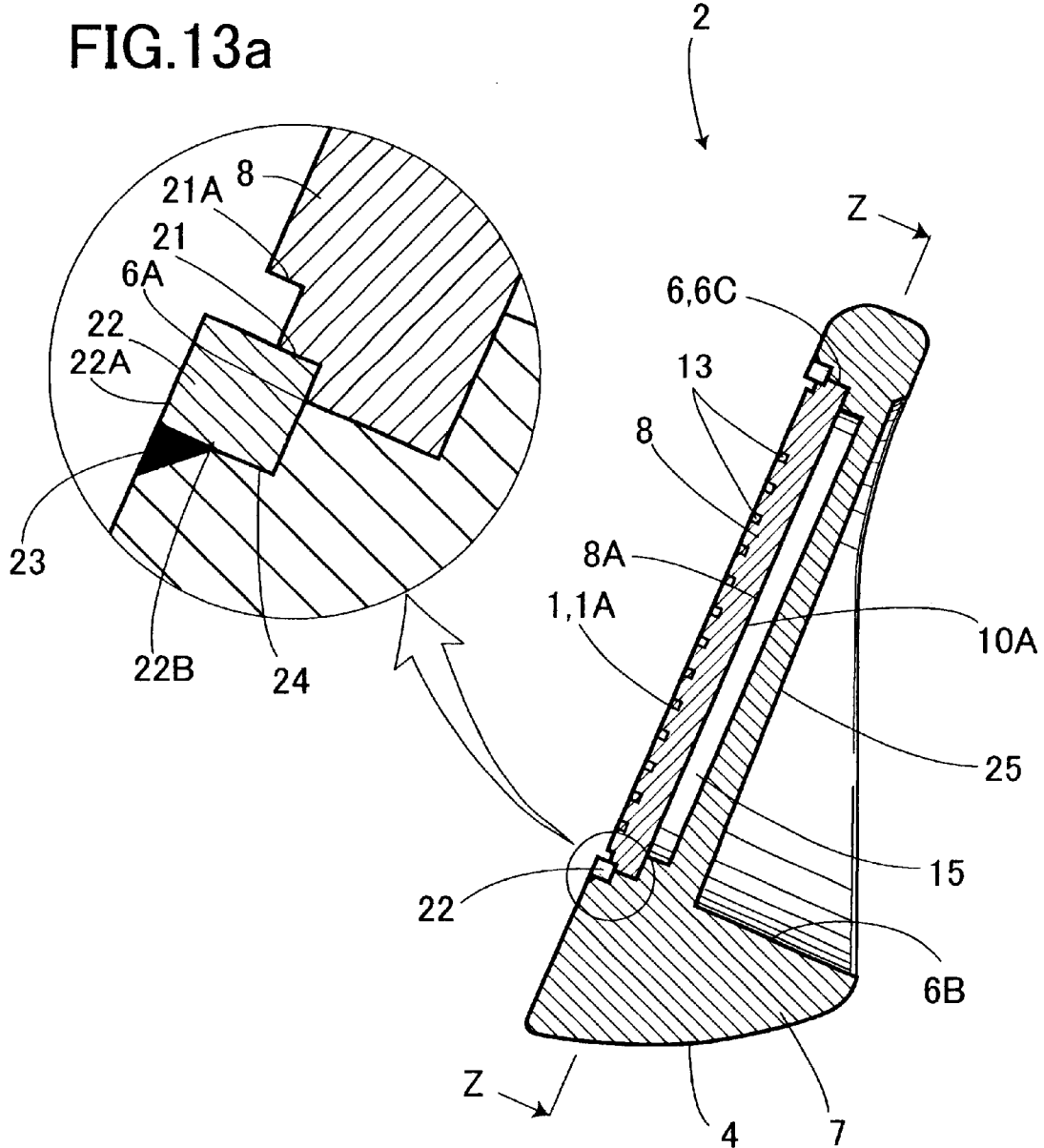
Figure 14:
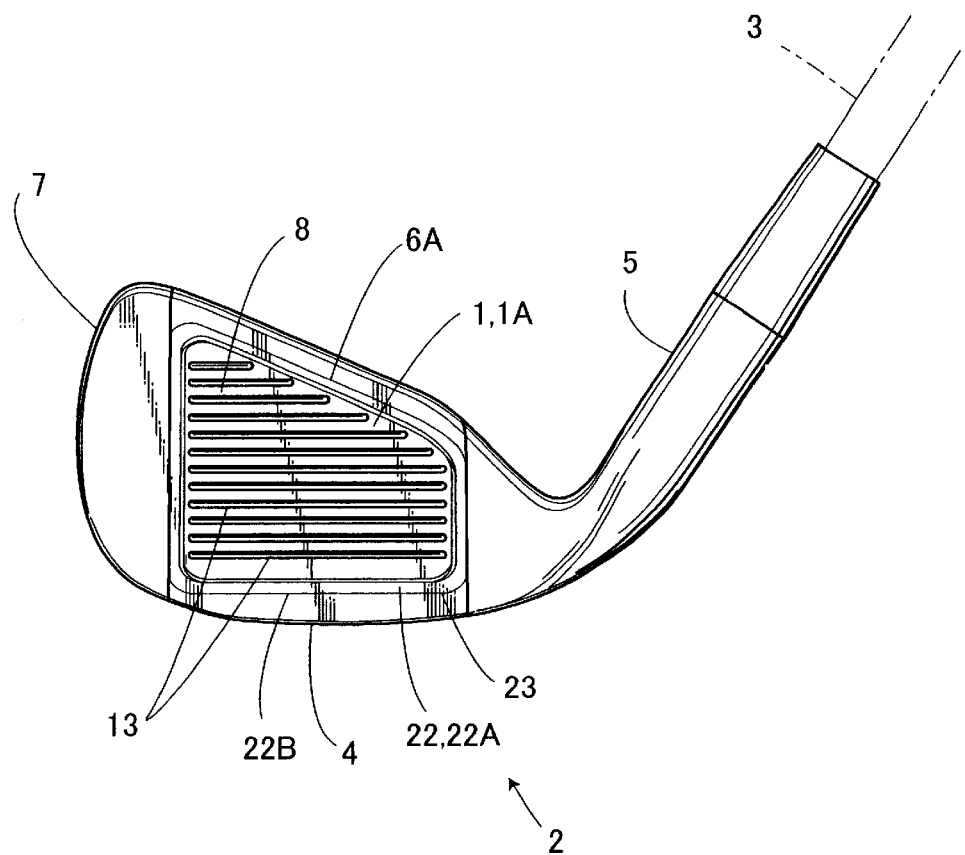
FIG. 14 is a front view illustrating the fourth embodiment of the present invention.
Figure 15:
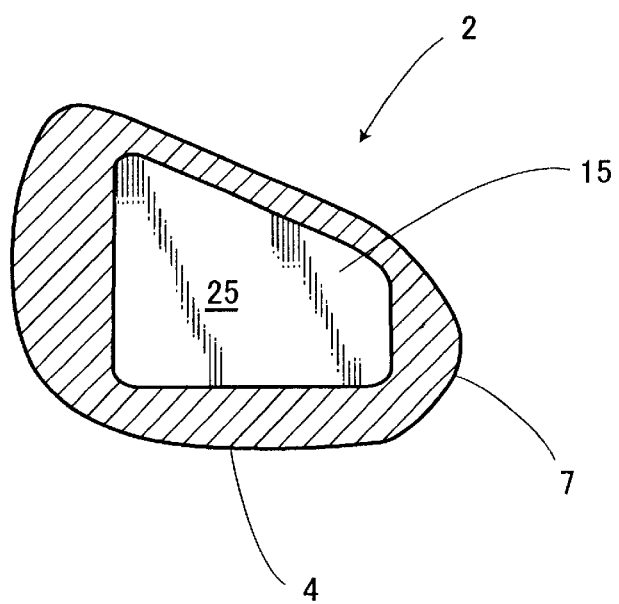
FIG. 15 is a cross-section on line Z—Z of FIG. 13 which illustrates the fourth embodiment of the present invention.
Figure 16:
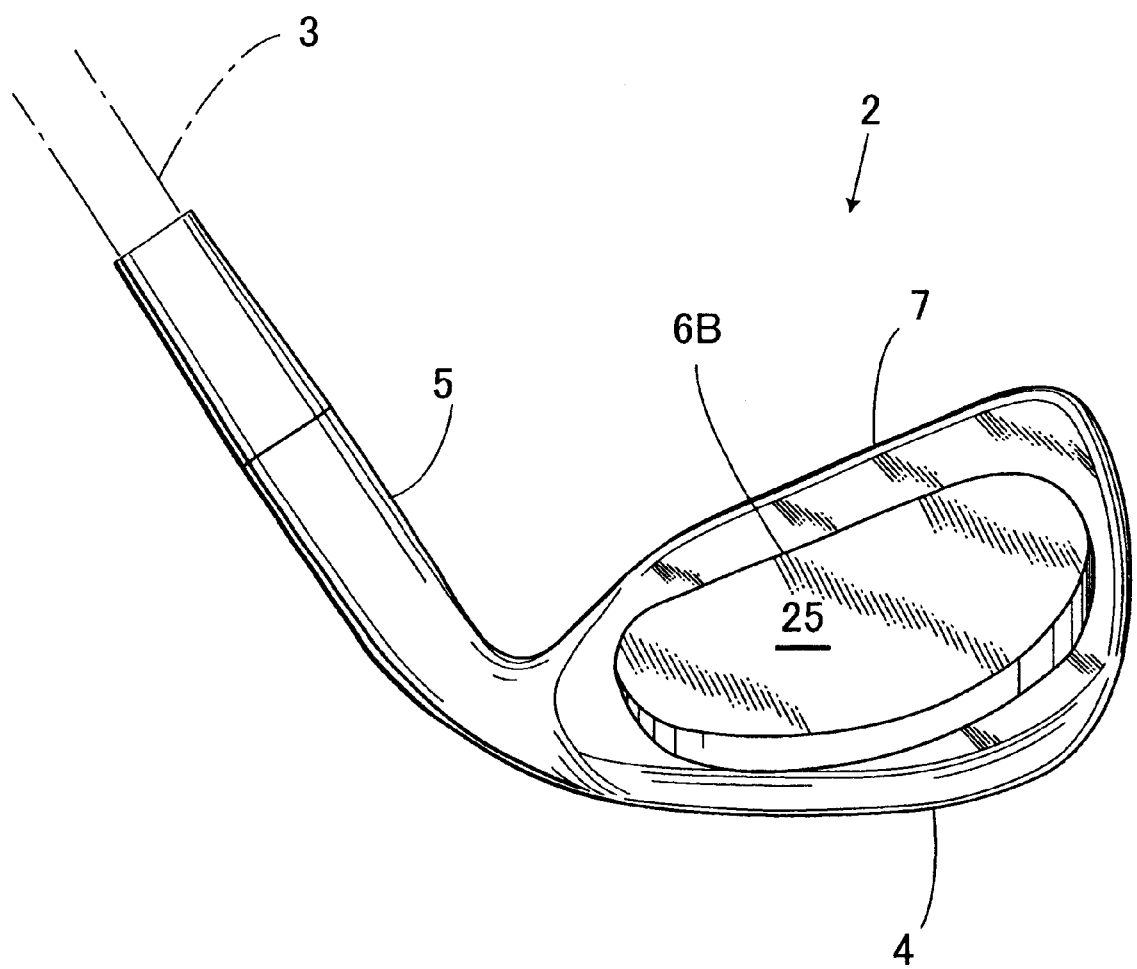
FIG. 16 is a rear view illustrating the fourth embodiment of the present invention.

FIGS. 6 to 8 illustrate a second embodiment, FIGS. 9 to 12 illustrate a third embodiment, and FIGS. 13 to 16 illustrate a fourth embodiment. The same reference symbols are used for parts the same as in the first embodiment, and detailed description thereof is omitted.

In the second embodiment shown in FIGS. 6 to 8, in the golf club with the shaft 3 connected to one side of the head 2 made by combining the head body 7, the face member 8 and the weight 10, by stoppingly engaging the front face edge 8A the face member 8 by means of the steps 11 and 12, and on the other hand by stoppingly engaging the rear face 8B by means of the ring member 9, the face member 8 itself can be secured without welding. Moreover, regarding the pure titanium weight 10 with a peripheral face 10B secured to the through hole 6, a front face 10A thereof abuts against the rear face 8B of the face member 8.

In this way, in the second embodiment, as in the first embodiment, the face member 8 itself can be secured without welding. Furthermore, by abutting the front face 10A of the weight 10 against the rear face 8B of the face member 8, the face member 8 can be held not only by the ring member 9 but also by the weight 10. Therefore, the bearing strength at the time of striking a ball can be improved.

In the third embodiment shown in FIGS. 9 to 12, a step 21 is formed in the front face edge of the face member 8 which is installed in a front side recess portion 6C formed in the front face opening edge 6A of the through hole 6 formed in the head body 7. The step 21 is formed around the entire periphery, in a notched shape of a substantially right angled L-shape so as to open towards the front. A ring member 22 is fitted to this step 21. The ring member 22 is made of a material which can be welded to the head body 7, and is formed in an annular shape, with a rectangular cross-section approximately the same shape as the step 21. Moreover, when the ring member 22 is attached to the step 21, the front face 22A thereof is arranged on the same plane as the front face of the face member 8, and the outer peripheral face 22B is arranged on the same plane as the outer peripheral face of the face member 8. The ring member 22 is such that the corner side of the front face 22A and the outer peripheral face 22B is welded to the head body 7 by laser welding, and the face member 8 is thus secured to the head body 7. Reference symbol 23 denotes a weld portion. The weight 10 is press fitted into the rear side of the through hole 6 and abuts against the rear face 8B of the face member 8.

Consequently, in this embodiment, when the head 2 is formed from the head body 7, the face member 8 and the weight 10 made of different materials, the step 21 is formed in the front face edge of the face member 8 around the whole periphery, and the ring member 22 is fitted into this step 21. The face 1 is formed by the front face of the face member 8 and the front face 22A of the ring member 22. Then, by securing this ring member 22 to the head body 7 by the weld portion 23, the impact force at the time of hitting a golf ball can be transmitted to the head body 7 via the face member 8 and the ring member 22. In particular, since the ring member 22 is annular and continuous, the occurrence of localized stress can be prevented.

In this manner, in this embodiment, in the golf club with the shaft 3 connected to one side of the head 2, the front side recess portion 6C is formed in the face corresponding portion 1A of the head body 7, and the step 21 is formed in the front face of the face member 8. Then the ring member 22 is combined with the step 21 to form the face 1, and the ring member 22 is secured to the head body 7 to form the head 2. As a result, the ring member 22 is provided in the step 21 on the front face edge side of the face member 8, and by securing the ring member 22 to the head body 7, the face member 8 itself can be secured without welding.

Moreover, by performing this securing by laser welding, the weld portion 23 for securing the ring member 22 to the head body 7 can be accurately formed.

In the fourth embodiment shown in FIGS. 12 to 16, a step 21 is formed in the front face edge of the face member 8 which is fitted to the front opening edge 6A of a front side recess portion 6C formed in the head body 7. In addition, a step 24 opening towards the front side is also formed in the front opening edge 6A. The step 21 is formed around the entire periphery, in a notched shape of a substantially right angled L-shape so as to open towards the front. Similarly, the step 24 is also formed around the entire periphery, in a notched shape of a substantially right angled L-shape so as to open towards the front. A ring member 22 is fitted to these steps 21 and 24. Here, reference symbol 21 A denotes a small step formed along the step 21 on the inside of the step 21. The ring member 22 is made of a material which can be welded to the head body 7. When the ring member 22 is fitted across the steps 21 and 22, the front face 22A is arranged in substantially the same plane as the face member 8, and the outer peripheral face 22B is arranged in substantially the same plane as the side peripheral face of the step 24. The ring member 22 is such that the corner portion of the front face 22A and outer peripheral face 22B is welded to the head body 7 by laser welding, and the face member 8 is thus secured to the head body 7. Here, reference symbol 23 denotes a weld portion. Moreover, behind the front side recess portion 6C is provided integral with the head body 7, a rear wall plate 25 blocking the rear of a cavity 15, that is slightly narrower than the recess portion 6C, via the cavity 15, and a rear face recess portion 6B is formed behind this rear wall plate 25.

Consequently, in this embodiment, when the head 2 is formed from the head body 7 furnished with the rear wall member 25 and the face member 8, made from different materials, the step 21 is formed in the front face edge of the face member 8 around the whole periphery, and the step 24 is formed in the front face opening edge 6A of the recess portion 6C, and the ring member 22 is fitted to these steps 21 and 24. The face 1 is formed by the front face of the face member 8 and the front face 22A of the ring member 22. Then, by securing the ring member 22 to the head body 7 by the weld portion 23, the impact force at the time of hitting a golf ball can be transmitted to the head body 7 via the face member 8 and the ring member 22. In particular, since the ring member 22 is annular and continuous, the occurrence of localized stress can be prevented.

In this manner, in this embodiment, in the golf club with the shaft 3 connected to one side of the head 2, the front side recess portion 6C is formed in the face corresponding portion 1A of the head body 7, and the step 21 is formed in the front face of the face member 8, and the step 24 is formed in the front face opening edge 6A of the recess portion 6C. Then the ring member 22 is combined with the steps 21 and 24 to form the face 1, and the ring member 22 is secured to the head body 7 to form the head 2. As a result, the ring member 22 is provided in the steps 21 and 24 on the front face edge side of the face member 8, and by securing the ring member 22 to the head body 7, the face member 8 itself can be secured without welding.

Moreover, the present invention is not limited to the above embodiments, and various modifications are possible within the scope of the gist of the invention.

The first aspect of the present invention is a golf club with a shaft connected to one side of a head made by combining a plurality of members, wherein the head has a step formed in the head body, and a member of a different type to the head body is arranged on this step, a ring member is provided so as to span between the head body and the member of a different type, and the member of a different type is secured by securing the head body to the ring member. When the member of a different type is secured, by securing via the ring member, an optimum member can be secured at an optional position.

The second aspect of the present invention is a golf club with a shaft connected to one side of a head, wherein the head is formed by forming a step in a face corresponding portion of a head body, arranging a face member in the step, arranging a ring member so as to span between the head body and the face member, and securing the ring member to the head body to thereby secure the face member to the head body. Hence even with a face member which is not suitable for welding, this can be secured to the head body, enabling an optimum face member to be secured.

The third aspect of the present invention is a golf club with a shaft connected to one side of a head, wherein the head is formed by forming a through hole in a head body, forming a step in a face corresponding portion of the head body and arranging a face member in the step, arranging a ring member behind the face member and securing the ring member to the head body to thereby secure the face member to the head body. Hence the face member can be reliably secured by stoppingly engaging the front side thereof in the step and then via the ring member arranged behind the face member.

The fourth aspect of the present invention is a golf club according to the third aspect, wherein a member with a lighter specific gravity than the head body is secured to a recess portion in the rear face of the head body. The weight distribution of the head can thus be adjusted by securing the member with a lighter specific gravity than the head body to the recess portion in the rear face of the head body. Hence the weight distribution of the head can be set freely.

The fifth aspect of the present invention is a golf club with a shaft connected to one side of a head, wherein the head is formed by forming a recess portion in a face corresponding portion of a head body, forming a step in a front face of a face member, combining a ring member with the step to form a face and securing the ring member to the head body. Hence the face member can be reliably secured via the ring member provided behind the face member.

The sixth aspect of the present invention is a golf club according to any one of the first through fifth aspects, wherein the securing is performed by laser welding. Hence the weld portion can be accurately formed enabling reliable securing.

What is claimed is:

1. A golf club, comprising:

a shaft connected to one side of a head made by combining a plurality of members;

wherein said head has a step formed in a head body;

wherein a member of a different type to said head body is arranged on said step;

wherein a ring member is provided so as to span between said head body and said member of a different type:

wherein said member of a different type is secured by securing said ring member to said head body; and wherein said step formed in said head body is formed facing rearward, and said member of a different type to said head body is formed with a corresponding step facing forward and said ring member is provided rearward of said member of a different type.

2. A golf club according to claim 1, wherein a member with a lighter specific gravity than said head body is secured to a recess portion formed in a rear side of said head body.

3. A golf club, comprising:

a shaft connected to one side of a head made by combining a plurality of members;

wherein said head has a step formed in a head body;

wherein a member of a different type to said head body is arranged on said step;

wherein a ring member is provided so as to span between said head body and said member of a different type, wherein said member of a different type is secured by securing said ring member to said head body; and wherein said step formed in said head body is formed as a recess portion facing forward so as to accommodate said member of a different type, and additional steps are formed in a peripheral portion of said step and in a peripheral portion of said member of a different type for accommodating said ring member.

4. A golf club according to claim 3, wherein behind said recess portion is provided integral with said head body, a rear wall plate blocking a rear of a cavity which is formed behind said member of a different type when secured in position.

* * * * *